(12) United States Patent
Kaiho et al.

(10) Patent No.: US 6,359,350 B1
(45) Date of Patent: Mar. 19, 2002

(54) ROTARY ELECTRIC MACHINE

(75) Inventors: Masayuki Kaiho; Hideaki Mori, both of Chiyoda; Shigekazu Kieda, Ishioka; Tadashi Sonobe, Iwaki; Ryoichi Shiobara, Hitachi; Akitomi Senba, Hitachi; Kenichi Hattori, Hitachi; Yoshiki Abe, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/547,393

(22) Filed: Apr. 11, 2000

(30) Foreign Application Priority Data

Apr. 14, 1999 (JP) .......................................... 11-106221

(51) Int. Cl.⁷ ................................................. H02K 9/00
(52) U.S. Cl. .............................. 310/52; 310/59; 310/61; 310/60 A
(58) Field of Search ............................ 310/52, 55, 58, 310/59, 61, 62, 63, 60 A

(56) References Cited

U.S. PATENT DOCUMENTS

| | | | | |
|---|---|---|---|---|
| 2,427,702 A | * | 9/1947 | Baudry | 171/252 |
| 3,652,881 A | * | 3/1972 | Albright et al. | 310/57 |
| 4,071,791 A | * | 1/1978 | Armor et al. | 310/59 |
| 4,141,669 A | * | 2/1979 | Darby et al. | 408/1 R |
| 4,609,840 A | * | 9/1986 | Eats et al. | 310/58 |

\* cited by examiner

Primary Examiner—Nestor Ramirez
Assistant Examiner—Thanh Lam
(74) Attorney, Agent, or Firm—Antonelli, Terry, Stout & Kraus, LLP

(57) ABSTRACT

There is provided an electric rotary machine having, in particular, a large capacity, in which a volume of cooling air is ensured for the axially center part thereof so as to make the temperature distribution uniform in the axial direction of the rotor and the stator. Each of gas coolers in the electric rotary machine is divided into not less than two of passage parts in which streams run in two directions in opposite to each other are created, and a stator-cooling connection passage is formed so as to connect not less than two passage parts located in the radially outward part of the stator 2 and axially defined by partition walls with the passage parts in the gas coolers in the electric rotary machine. With this arrangement, cold gas can be led into the axially center part of the stator without increasing the total ventilation resistance, and accordingly, it is possible to prevent occurrence of temperature rise in the axially center parts of the stator and the rotor, which would be caused in the electric rotary machine having, in particular, a large capacity.

5 Claims, 7 Drawing Sheets

ROTARY ELECTRIC MACHINE

BACKGROUND OF THE INVENTION

The present invention relates to an electric rotary machine such as a turbine generator, and in particular to a cooling structure thereof.

As to ventilation cooling for a hermetic electric rotary machine, coolers are installed in a ventilation passage through which gas warmed after cooling a stator and a rotor is led into the cooler so as to cool the gas. In this installation method, it is general to arrange the coolers at positions which are left-right symmetric on the left and right sides, as disclosed in Japanese Laid-Open Patent Publication No. H5-161307. In the case of a single forward system, gas flows outward from the center part and through the coolers, and then flows through a fan for boosting up the gas so as to cool the rotor and the stator before it is returned into the coolers. Further, in the method of installing the coolers, as disclosed in this publication, the coolers are located above and away from the stator, being spaced from coil ends of the stator by means of a partition panel. By arranging the coolers at such positions, water produced through condensation within the coolers can be prevented from dropping onto the stator and the coil end of the stator.

However, the conventional technology stated in the Japanese Laid-Open Patent Publication No. H5-161307 does not concern those relating to the following problems.

First, it is required to aim at uniformly distributing the temperature in the axial direction in the case of a large capacity of an electric rotary machine, and accordingly, the axial lengths of the rotor and the stator become longer. Thus, there is such a problem that the volume of cooling air flowing into the ventilation cooling passage located in the axially center part is insufficient, and therefore, the temperature of the axially center part becomes higher than that of an axial end part.

SUMMARY OF THE INVENTION

An object of the present invention is to provide an electric rotary electric machine which can ensure the volume of cooling air flowing into the cooling air passage in the axial center part, and which can uniformly distribute the temperature in the axial direction.

To the end, according to the present invention, there is provided a rotary machine having internal machine gas coolers, in which a cooling air passage formed in each of the machine gas coolers, is divided into not less than two of passage parts in which streams in two opposite directions are created, partial zones located on radially outsides of a stator, and divided into not less than two of parts in the axial direction, and connection passages connecting the passage parts in the coolers are formed.

DESCRIPTION OF THE PREFERRED EMBODIMENTS

Figure 1:
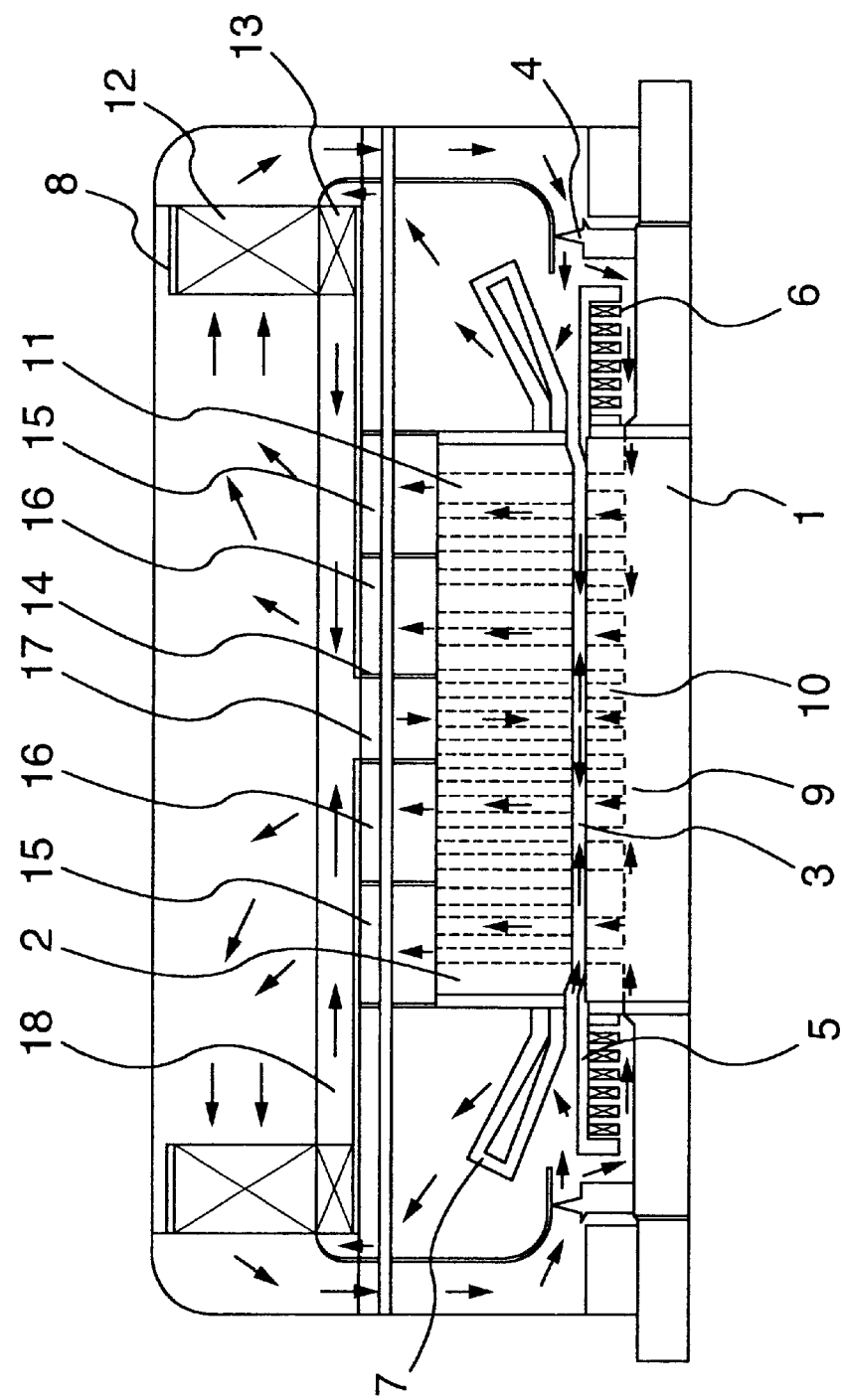
FIG. 1 is a view for explaining a structure of an electric rotary machine and flowing of cooling gas in a first embodiment of the present invention.

Explanation will be hereinbelow made a first embodiment of a first embodiment of the present invention with reference to FIGS. 1 to 4. FIG. 1 shows a structure of a rotary machine in a first embodiment of the present invention and flowing of cooling gas.

A rotor 1 fitted on the center part of a rotary shaft, gas blown from fans 4 attached to opposite sides of the rotor 1 is divided into two streams one of which runs into an air gap 3 after passing though clearances between retaining rings 5 and stator coil ends 6 provided respectively on the opposite sides of the rotary machine, and the other one of which flows into clearances between rotor coil ends 6 pressed by retaining rings and the rotary shaft. The latter stream flows through subslots 9 and radial ducts 10 formed in the rotor 1 so as to be introduced into rotor 1, and then, flows into the air gap 3 so as to merge into the former stream. After this mergence, the gas flows through a cooling passage 11 in a stator 2 while it cools the stator 2, and flows into main passage parts 12 in gas coolers 8 (which will be hereinbelow denoted as "machine gas coolers) in the rotary machine through stator first and second sections 15, 16 which are divided by partition walls 14 and which are zones in the radially outward part of the stator.

The gas heated after cooling the rotor 1 and the stator 2 and the like, creates streams outward from the axially center part in the main passage parts 12 in the machine gas coolers 8 so as to be cooled before it is returned into the fans 4. Further, parts of the stream going to the gap between the retaining rings 5 and the coil ends 7 of the stator run along the coil ends 7 of the stator without directing toward the air gap 3, and then runs into auxiliary passage parts 13 of the machine gas coolers 8. Thereafter, they creates streams to the center part from the axially outsides in the passage parts 13 of the coolers, and are cooled. The gas cooled by the passage parts 13 of the coolers flows through stator-cooler connection passages 18 connecting between the passage parts 13 of the machine gas coolers and a third section 17 of the stator, and flows into the third section 17 of the stator. The gas having cooled the third section 17 of the stator flows radially inward in the cooling passages 11 in the stator, and are then jetted into the air gap 3 before it merges into the streams jetted from the radial ducts 10 in the rotor 1. Thereafter, the gas having merged flows through the air gap 3 outward from the axial center part, and flows radially outward in the cooling passages 11 in the stator before it is jetted into the second sections 16 of the stator.

Figure 2:
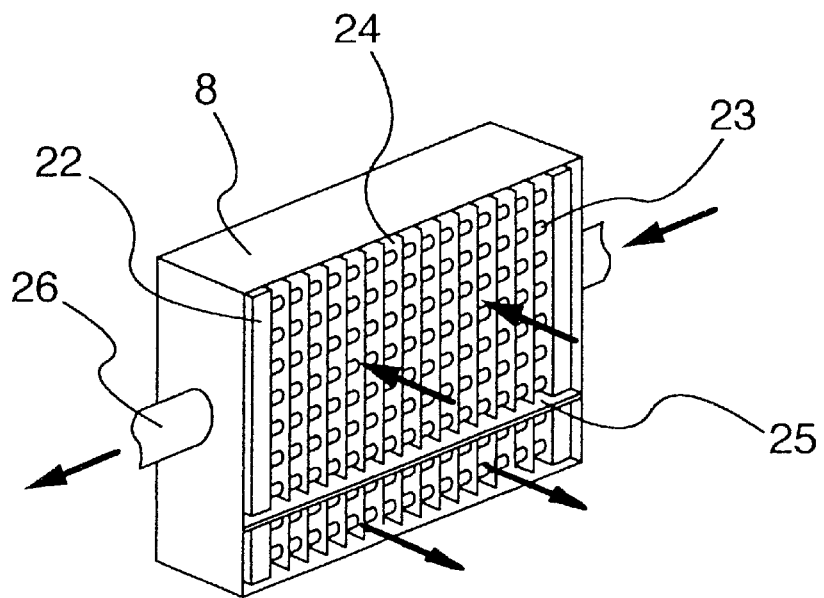
FIG. 2 is a perspective view illustrating a connection passage between a stator and a cooler in the first embodiment of the present invention.
Figure 3:
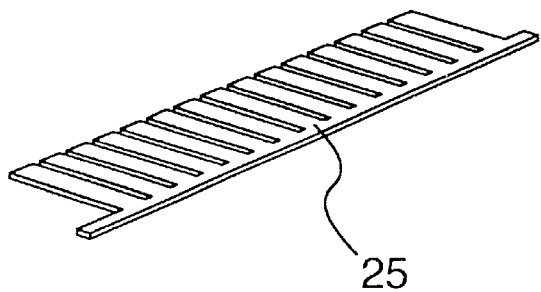
FIG. 3 is a structural view illustrating the interior of a gas cooler in the rotary machine in the first embodiment of the present invention.

The main passage part 12 of each of the machine gas coolers 8 is preferably separated from the passage parts 13 of machine gas cooler in view their passage structures so that the streams running therethrough are prevented from merging with each other so as to enhance the cooling efficiency. Explanation will be made of the method of separating the passage parts from each other with reference to FIGS. 2 and 3. FIG. 2 is a structural view which shows the interior of machine the gas cooler 8 in this embodiment, and FIG. 3 is a view which shows an example of a structure of a partition panel 25 shown in FIG. 2.

Cooling water flows into the machine gas cooler 8 from a main cooling pipe line 26 on the inlet side, branches into several auxiliary cooling pipe lines 23 from an inlet side header 22, and is then gathered at an outlet side header 22 before it flows into the main cooling pipe line 26 on the outlet side.

The auxiliary pipe lines 23 are attached thereto with thin plate fins 24 for cooling gas passing through the machine gas cooler 8. A comb-like partition panel 15 as shown in FIG. 3 is mounted in the gas cooler 8 in the rotary machine. The gas cooler 8 in the rotary machine is divided into the upper cooler main passage part 12 and the lower cooler auxiliary passage part 13. Heat insulating panel may be applied to the outer surface of the partition panel 25 in order to enhance the cooling efficiencies of the cooler main passage part 12 and the cooler auxiliary passage part 13, or the partition panel 12 itself may be made of a material having a high degree of heat insulation.

Figure 4:
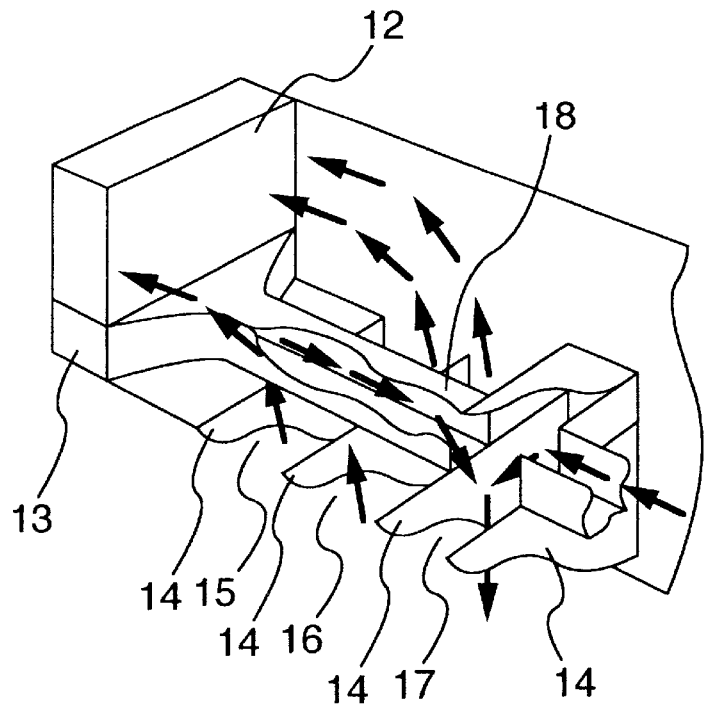
FIG. 4 is a view illustrating a perspective view illustrating a structure of a partition panel located in the gas cooler in the machine in the first embodiment of the present invention.

FIG. 4 is a perspective view which shows the stator-cooler connection passage 18 connecting between the gas cooler 8 in the rotary machine and the third section 17 in the stator.

As shown, a connection part between the stator-cooler connection passage 18 and the auxiliary passage part 13 of the cooler and a connection part between it and the third section 17 of the stator are alone widened, but the remaining part is formed of a thin pipe line. With this arrangement, resistance against gas flowing upward from the first and second sections 15, 16 of the stator can be restrained to a small value. The gas in the rotary machine flows through the first section 15 and the second section 16 in the stator which are separated from each other by partition walls 14 in the radially outside zone of the stator 2, and then flows into the cooler main passage part 12 in the gas cooler 8 in the rotary machine. The gas flowing upward from the first and second sections 15, 16 of the stator cools the stator 2, the rotor 1 and the like while it raises its temperature, and then flows into this zone, and accordingly, it is preferable to wrap a heat insulating material around the stator-cooler connection passage 18 in which the gas having just flown out from the machine gas cooler 8. With the arrangement mentioned above, it is possible to cool the axially center part of the rotary machine with a high degree of accuracy. Further, an increase in the ventilation resistance caused by the installation of the connection passages can be minimized, and accordingly, it is possible to prevent the total cooling air volume from being lowered.

Next, explanation will be made of a second embodiment of the present invention with reference to FIGS. 5 and 6.

Figure 5:
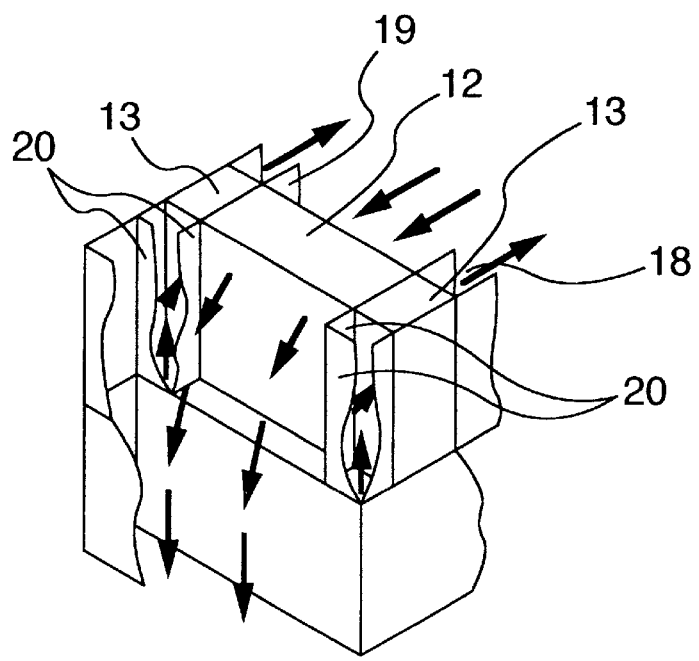
FIG. 5 is a perspective view illustrating a part around a gas cooler in a rotary machine in a second embodiment of the present invention.
Figure 6:
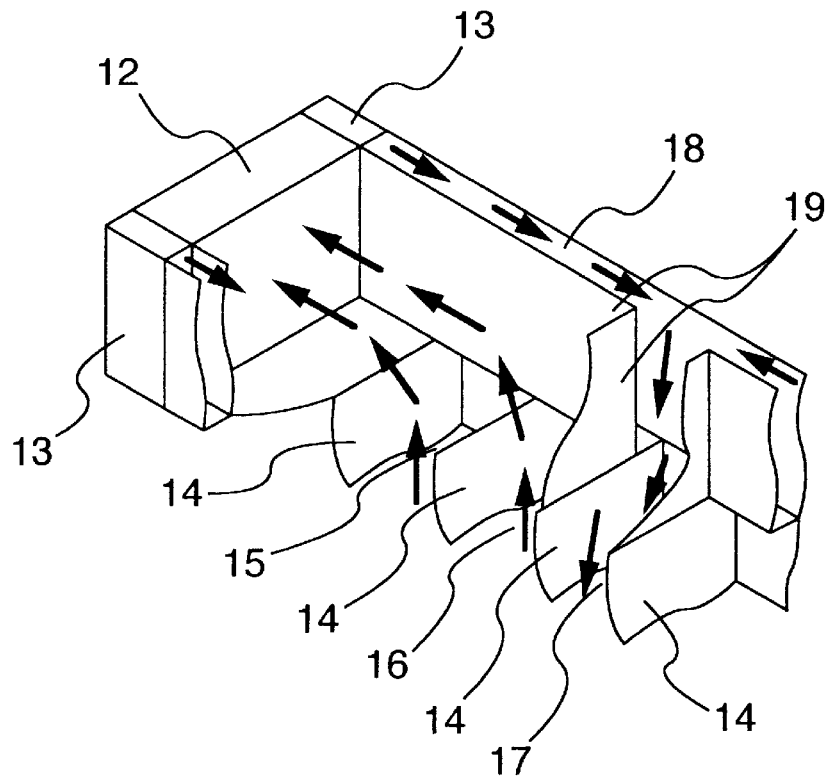
FIG. 6 is a perspective view illustrating a connection passage between a stator and a cooler.

FIG. 5 shows a perspective view which shows a part around a gas cooler in an electric rotary machine in the second embodiment of the present invention, and FIG. 6 is a perspective view which shows a stator-cooler connection passage 18 in the second embodiment of the present invention.

In this embodiment, the gas cooler 8 in the rotary machine is divided into three passage parts, a flow passage part positioned in the center part is used as the cooler main passage part 12, and two passage parts positioned in opposite side parts 12 are used as cooler auxiliary passage parts 12. Gas having passed through the coil end 7 of the stator flows through passages defined by inlet partition walls 20 in the cooler without flowing through the inside of the stator, and flows into the cooler auxiliary passage part 13 in the machine gas cooler 8. Gas having flown out from the cooler auxiliary passage part 13 flows into the stator-cooler connection part 18 defined by partition walls 19 of the connection passage and then flows into the third section 17 defined by partition walls 14.

Meanwhile, gas flowing upward from the first section 15 and the second section 16 defined by the partition walls 14 flows through a zone between the partition walls 19 of the connection passage, and then flows into the cooler main passage part 12. The gas flowing through the cooler main passage part 12 creases a stream flowing in a direction reverse to the direction of the gas in the cooler auxiliary passage part 13 and is then cooled in the cooler, and thereafter, it flows out from the cooler main passage part 12, and is directed toward the fan 4.

With this arrangement, the resistance against gas flowing upward from the first section 15 and the second section 16 of the stator becomes extremely low. Accordingly, cold gas can be led into the axial center part of the stator 2 without increasing the total ventilation resistance. It is noted that the thin plate fins 24 in the gas cooler 8 in the rotary machine may be used, in stead of the thin wall fins 25 shown in FIG. 25 in order to laterally separate the machine gas cooler 8. Heat insulating materials may be applied to the outer surfaces of the thin plate fins which are used instead of the partition panel 25 in order to enhance the degree of heeat insulation.

Figure 7:
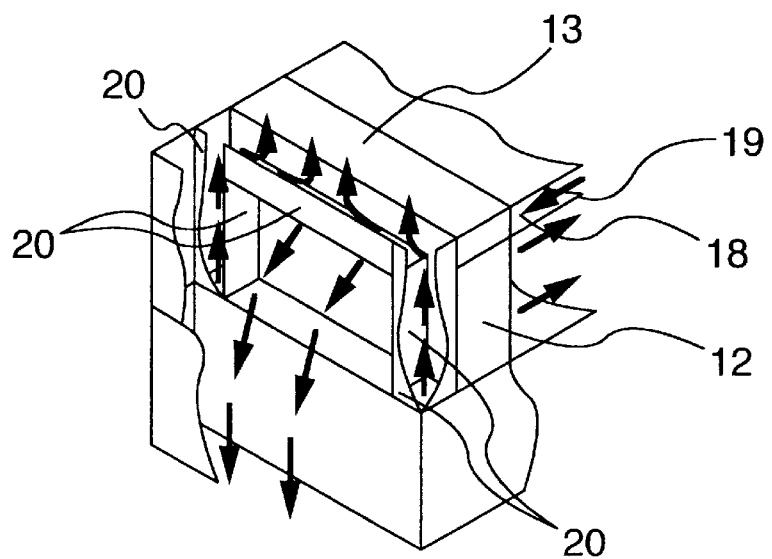
FIG. 7 is a perspective view illustrating a part around a gas cooler in a rotary machine in a third embodiment of the present invention.
Figure 8:
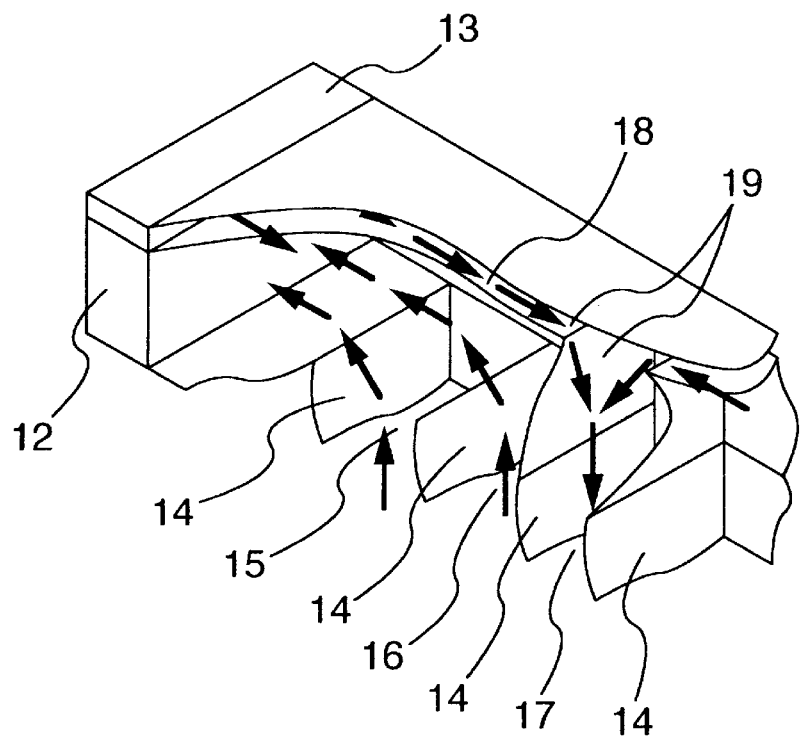
FIG. 8 is a perspective view illustrating a connection passage between a stator and a cooler in the third embodiment of the present invention.

Explanation will be made of a third embodiment of the present invention with reference to FIGS. 7 and 8. FIG. 7 is a perspective view which shows a part around a machine gas cooler in the third embodiment of the present invention, and FIG. 8 is a perspective view which shows a stator-cooler connection passage 18 in the third embodiment of the present invention.

In this embodiment, the machine gas cooler 8 is divided into upper and lower two passage parts, the lower passage part being used as the cooler main passage part 12 and the upper passage part being used as the cooler auxiliary passage part 13. The gas flows in a manner similar to that explained in the second embodiment. With this arrangement, since no resistance is present against the gas flowing upward from the first section 15 and the second section 16 of the stator, cold gas can be led into the axially center part of the stator 2 without increasing the total ventilation resistance. In the case of this embodiment, the separating direction of the machine gas cooler 8 is similar to that in the first embodiment, and accordingly, it is necessary to arrange a partition wall 25 similar to that shown in FIG. 2, at a predetermined position.

Figure 9:
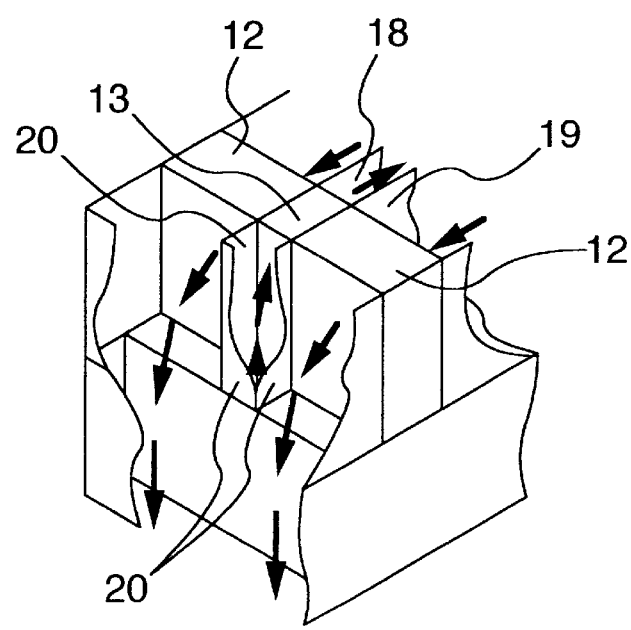
FIG. 9 is a perspective view illustrating a part around a gas cooler in a rotary machine in a rotary machine in a fourth embodiment of the present invention.

Next, explanation will be made of a fourth embodiment of the present invention with reference to FIGS. 9 and 10. FIG.

Figure 10:
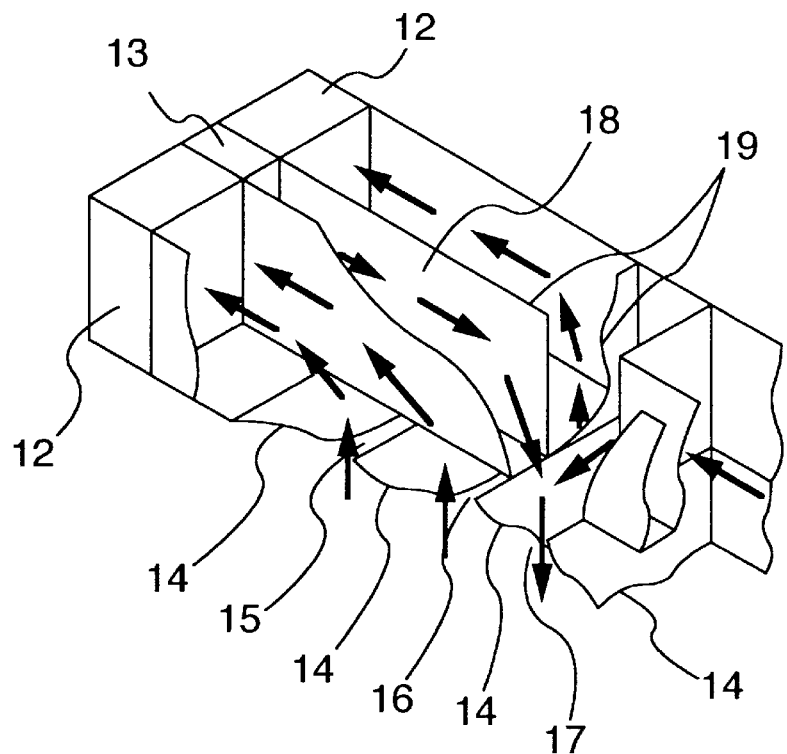
FIG. 10 is a perspective view illustrating a connection passage between a stator and a cooler in the forth embodiment of the present invention.

9 is a perspective view which shows a part around a machine gas cooler 8 in the fourth embodiment of the present invention, and FIG. 10 is a perspective view which shows a stator-cooler connection passage 18 in the third embodiment of the present invention.

This embodiment is the same as the second embodiment, except that a passage part arranged in the center part is used as the cooler auxiliary passage part 13 while two passage parts arranged in opposite side parts are used as the cooler main passage part 12. The gas flows in the same manner as that explained in the second embodiment. With this arrangement, the resistance against the gas flowing upward from the first section 15 and the second section of the stator can be decreased. Accordingly, cold gas can be led into the axially center part of the stator 2 without increasing the total ventilation resistance. In the case of this embodiment, the separating direction of the machine gas cooler 8 is similar to that in the second embodiment, and accordingly, it is not necessary to mount the partition panel 25.

The machine gas cooler 8 in each of the above-mentioned embodiment is formed in such a structure that cooling water flows in a horizontal direction while the thin plate fins 24 are arranged in the vertical direction. However, the present invention should not be limited to this structure, but it can be applied in the case of a machine gas cooler 8, in which cooling water flows in the vertical direction while the thin plate fins 24 are arranged in a horizontal direction. In this case, the partition panel 25 is required in the second and the fourth embodiment, but no partition panel 25 is required in the first and the third embodiment.

Figure 11:
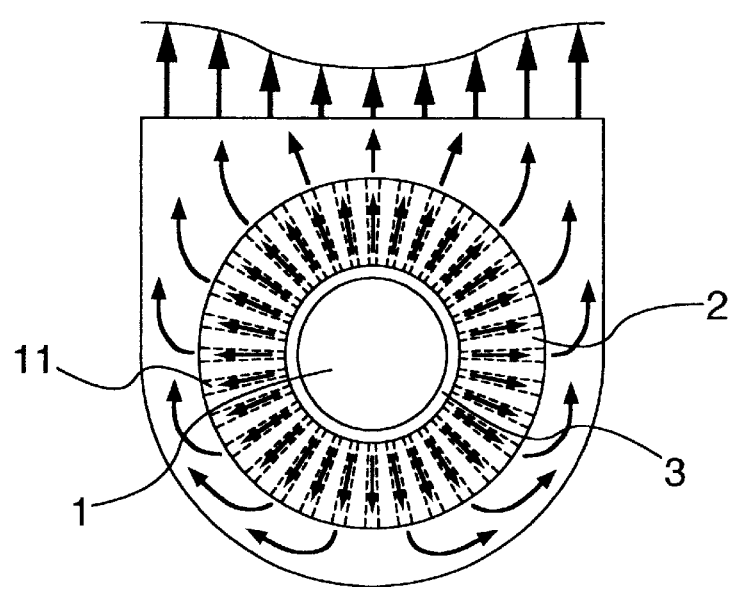
FIG. 11 is a cross-sectional view showing air velocity distributions in a first and a second section in the stator of the rotary machine according to the present invention.

FIG. 11 is a cross-sectional view which shows an air velocity distribution in the first section 15 and the second section 16 of the stator according to the present invention. As shown in this figure, cooling gas having flown out from the stator cooling passage 11 in the lower half part, flows upward while it diverges into right and left two streams and flows upward, and accordingly, the air velocity distribution is such that the air velocity on the opposite side is higher than that in the center part. Accordingly, as to the resistance against the gas flowing upward from the first section 15 and the second section 16 of the stator, it is clear that the resistance is the lowest in the third embodiment of the present invention. Further, the resistance is lower in the first and the fourth embodiment than in the second embodiment.

Figure 12:
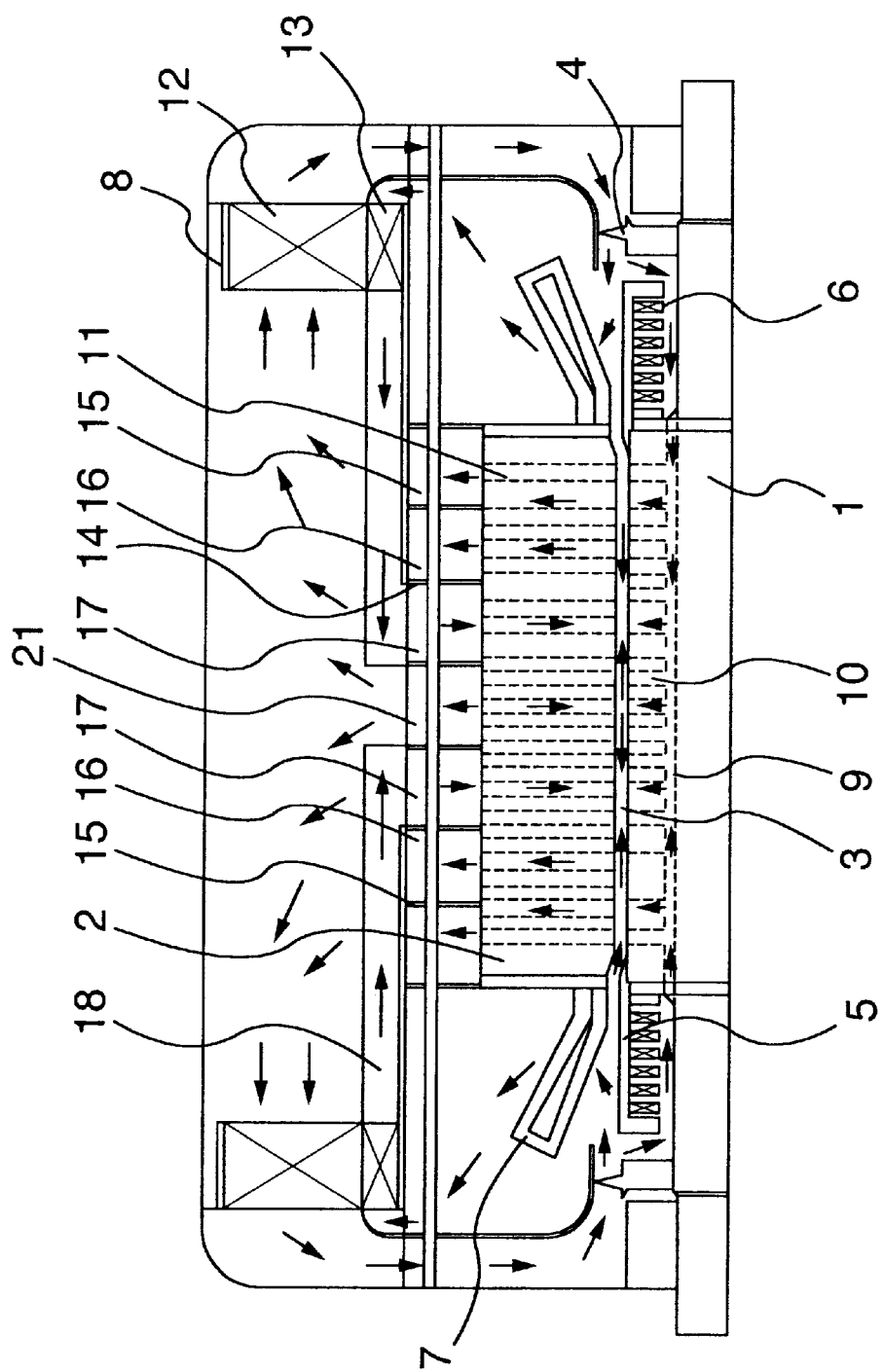
FIG. 12 is a view for explaining the structure of a rotary machine in a fifth embodiment of the present invention, and flowing of a cooling gas.

FIG. 12 is a view for Explaining an electric rotary machine in a fifth embodiment of the present invention, and the way of flowing of cooling gas in this embodiment.

In this embodiment, the outside zone of the stator 2 is divided into seven zone parts including stator first left and right sections 15 to left and right stator fourth sections 17 and a fourth section 21, the auxiliary passage parts 13 in the left and right coolers are connected with left and right two stator third sections 17, respectively. The cooler auxiliary passage parts 13 may be connected with a plurality of zone parts outside of the stator 2 as explained in this embodiment in such a case that the electric rotary machine has a large capacity, having, in particular, a long axial length.

It is noted that corner parts of components such as the stator-cooler connection part 18 and the like in the all embodiments of the present invention, are rounded so as to reduce the ventilation resistance in the connection passage and the like, and accordingly, the total resistance can be reduced, thereby it is possible to provide an electric rotary machine having a high degree of cooling efficiency.

With the electric machine according to the present invention, cold gas from the gas coolers in the rotary machine can be led direct into the axially center part of the stator from the gas coolers in the rotary machine, and accordingly, the temperature distribution in the axial direction of the electric rotary machine can be made to be uniform, thereby it is possible to provide an electric rotary machine having a high ventilation air cooling capability.

What is claimed is:

1. An electric rotary machine comprising a rotor formed therein with cooling passages and a stator fitted on a rotary shaft and formed therein with a plurality of branch passages, at least one gas cooler for cooling gas circulated by at least one fan through the cooling passages in the rotor and the plurality of branch cooling passages in the stator, the gas cooler being partitioned therein into at least two independent cooling passage parts through which gas flows therethrough in opposite directions, a stator connection passage through which gas flowing through one of the at least two independent cooling passage parts of the gas cooler in a first direction is led into one of the plurality of branch passages in the stator, and a passage means for guiding gas warmed up through the branch cooling passages in the stator and the cooling passages in the rotor, into another one of the at least two independent cooling passage parts in the gas cooler without being mixed with the gas passing through the stator connection passage so that the gas flows through the another one of the at least two independent cooling passage parts in a second direction opposite to the first direction.

2. An electric rotary machine as set forth in claim 1, wherein the gas passing through the another one of the at least two independent cooling passage parts in the gas cooler is led in part into the cooling passages in the rotor along the rotary shaft.

3. An electric rotary machine as set forth in claim 1, wherein the gas passing through the another one of the at least two independent cooling passage parts of the gas cooler is led in part into the one of the at least two independent cooling passage parts of the gas cooler.

4. An electric rotary machine as set forth in claim 1, wherein the gas led into one of the plurality of branch passages passes through an other of the plurality of branch passages in the stator and then is led into the another one of the at least two independent cooling passage parts of the gas cooler.

5. An electric rotary machine as set forth in claim 4, wherein the gas passing through the another one of the at least two independent cooling passage parts in the gas cooler is led in part into the cooling passages in the rotor along the rotary shaft, and then is merged into the gas passing through the another of the plurality of branch passages in the stator.

* * * * *